(12) United States Patent  
Nakanishi et al.

(10) Patent No.: US 11,144,789 B2  
(45) Date of Patent: Oct. 12, 2021

(54) MODEL PARAMETER LEARNING DEVICE, CONTROL DEVICE, AND MODEL PARAMETER LEARNING METHOD

(71) Applicants: HONDA MOTOR CO., LTD., Tokyo (JP); Kyoto University, Kyoto (JP)

(72) Inventors: Kosuke Nakanishi, Saitama (JP); Yuji Yasui, Saitama (JP); Wataru Sasaki, Kyoto (JP); Shin Ishii, Kyoto (JP)

(73) Assignees: HONDA MOTOR CO., LTD., Tokyo (JP); KYOTO UNIVERSITY, Kyoto (JP)

( * ) Notice: Subject to any disclaimer, the term of this patent is extended or adjusted under 35 U.S.C. 154(b) by 202 days.

(21) Appl. No.: 16/574,370

(22) Filed: Sep. 18, 2019

(65) Prior Publication Data

US 2020/0097772 A1    Mar. 26, 2020

(30) Foreign Application Priority Data

Sep. 25, 2018  (JP) .............................. JP2018-178677

(51) Int. Cl.
*G06K 9/00*     (2006.01)
*G06K 9/62*     (2006.01)
(Continued)

(52) U.S. Cl.
CPC .......... *G06K 9/6262* (2013.01); *G05D 1/0221* (2013.01); *G06K 9/40* (2013.01);
(Continued)

(58) Field of Classification Search
CPC ...... G06K 9/6262; G06K 9/40; G06K 9/6256; G06K 9/00791; G06N 3/08; G06N 3/04;
(Continued)

(56) References Cited

U.S. PATENT DOCUMENTS

2013/0310061 A1*  11/2013  Sawai ................... H04W 72/02
                                                      455/454
2019/0039622 A1*   2/2019  Kumazaki .............. B60K 6/365
(Continued)

FOREIGN PATENT DOCUMENTS

JP        2018-89301 A      6/2018

*Primary Examiner* — Charlotte M Baker
(74) *Attorney, Agent, or Firm* — Westerman, Hattori, Daniels & Adrian, LLP

(57) ABSTRACT

Provided is a model parameter learning device and the like capable of learning model parameters such that the influence of a noise in input data can be suppressed. A model parameter learning device (1) alternately carries out first learning processing for learning model parameters $W_1$, $b_1$, $W_2$ and $b_2$ such that an error between data $X_{out}$ and data $X_{org}$ is minimized, and second learning processing for learning model parameters $W_1$, $b_1$, $W_m$, $b_m$, $W_q$ and $b_q$ such that a loss function $L_{AE}$ is minimized.

18 Claims, 6 Drawing Sheets

(51) Int. Cl.
*G06N 3/08* (2006.01)
*G06N 3/04* (2006.01)
*G06K 9/40* (2006.01)
*G05D 1/02* (2020.01)

(52) U.S. Cl.
CPC ............ *G06K 9/6256* (2013.01); *G06N 3/04* (2013.01); *G06N 3/08* (2013.01); *G05D 2201/0213* (2013.01)

(58) Field of Classification Search
CPC .... G06N 3/0454; G06N 3/084; G05D 1/0221; G05D 2201/0213; G05D 1/0088; G05D 1/0246
USPC .......................................... 382/104; 455/454
See application file for complete search history.

(56) References Cited

U.S. PATENT DOCUMENTS

2019/0325671 A1* 10/2019 Takasu ................. G06N 3/0481
2020/0012956 A1* 1/2020 Ikeda ..................... G06N 20/00

* cited by examiner

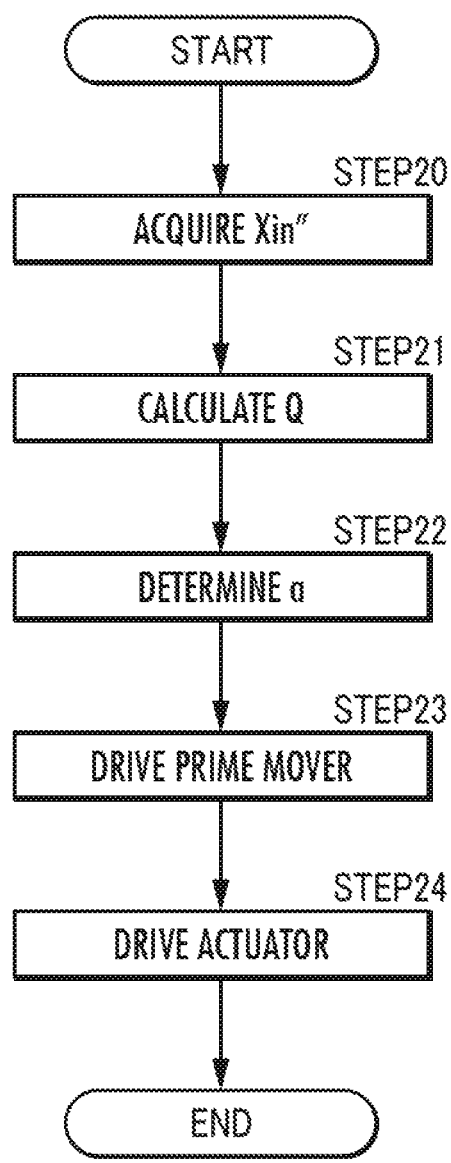

MODEL PARAMETER LEARNING DEVICE, CONTROL DEVICE, AND MODEL PARAMETER LEARNING METHOD

BACKGROUND OF THE INVENTION

1. Field of the Invention

The present invention relates to a model parameter learning device, which learns model parameters, and the like.

2. Description of the Related Art

Hitherto, as a model parameter learning device, there has been known one described in Patent Document 1. The model parameter learning device is adapted to learn the model parameters of a neural network model by an error backpropagation method, in which the mean square error between an input training image and an output training image is taken as a loss function. In this case, the input training image is a living organism image that contains an object, while the output training image is a living organism image that does not contain an object.

Patent Document 1: Japanese Patent Application Laid-Open No. 2018-89301

In recent years, for example, the travel state of an autonomous driving vehicle has been controlled by using the output data of a neural network model, which receives image data obtained by an imaging device. Applying a neural network model having model parameters learned by the model parameter learning device described in Patent Document 1 to such an autonomous driving vehicle poses a problem described below.

In the case of an autonomous driving vehicle, the noise components in image data increase in some cases when the conditions of surrounding environment of the vehicle change. Meanwhile, in the neural network model described in Patent Document 1, model parameters are simply learned by the error backpropagation method, in which the mean square error between an input training image and an output training image is taken as a loss function. For this reason, if the noise components in image data increase, then the travel state of the autonomous driving vehicle inconveniently becomes unstable because of the susceptibility of the output data of the neural network model to noise. The same applies to a case where industrial equipment other than autonomous driving vehicles or a model other than a neural network model is used. Further, the susceptibility to noise also increases in a case where input data other than image data is used.

SUMMARY OF THE INVENTION

The present invention has been made with a view of solving the problem described above, and an object of the invention is to provide a model parameter learning device and the like capable of learning model parameters such that the influence of a noise in input data can be suppressed.

To this end, a model parameter learning device in accordance with the present invention includes: a characteristic data acquiring unit which acquires characteristic data, which is the data of a parameter indicating at least one of a physical characteristic and a visual characteristic of an object; a first noise-added data creating unit which creates first noise-added data by adding predetermined first noise data to characteristic data; a model data acquiring unit which has a first model and a second model, and inputs output data of the first model to the second model and acquires second model data output from the second model in a case where the first noise-added data is input to the first model; a teacher data acquiring unit which acquires teacher data corresponding to characteristic data; and a first learning unit which carries out first learning processing for learning a model parameter of at least one of the first model and the second model such that an error between the second model data and the teacher data is minimized.

According to the model parameter learning device, the first noise-added data is created by adding the predetermined first noise data to the characteristic data. Further, the teacher data is acquired as data corresponding to the characteristic data. Further, the first learning processing is carried out to learn a model parameter of at least one of the first model and the second model such that the error between the second model data output from the second model and the teacher data is minimized when the first noise-added data is input to the first model. Hence, as the first learning processing is repeatedly carried out, the model parameter is learned to bring the second model data close to the teacher data. The teacher data corresponds to the characteristic data, so that the model parameter can be learned to cause the second model data to take a value in which the influence of a noise in the first noise-added data is suppressed.

Preferably, the model parameter learning device in accordance with the present invention further includes: an execution suspending unit which suspends inputting the first noise-added data to the first model and the first learning processing in a case where a number of executions of the first learning processing reaches a first predetermined value; and an input characteristic data setting unit which sets data obtained by adding predetermined second noise data to characteristic data, or characteristic data, as input characteristic data, wherein the model data acquiring unit further has a third model which is separate from the second model, which inputs the output data of the first model to the third model and acquires third model data output from the third model when the input of the input characteristic data to the first model in a case where the first learning processing is being suspended, and the model parameter learning device further comprises a second learning unit which carries out second learning processing for learning the model parameter of at least one of the first model and the third model such that a loss function that contains third model data as an independent variable, is minimized.

According to the model parameter learning device, when the number of executions of the first learning processing reaches the first predetermined value, the input of the first noise-added data to the first model and the first learning processing are suspended. Further, the data obtained by adding the predetermined second noise data to the characteristic data, or the characteristic data is set as the input characteristic data. Then, the second learning processing is carried out to learn the model parameter of at least one of the first model and the third model such that the loss function that contains, as an independent variable, the third model data output from the third model when the input characteristic data is input to the first model, is minimized. Hence, as the second learning processing is carried out, the model parameter is learned such that the loss function is minimized. Thus, when the input characteristic data obtained by adding the predetermined second noise data to the characteristic data is input to the first model, the model parameter can be learned to cause the third model data to take a value in which the influence of a noise in the input characteristic data is suppressed.

In the model parameter learning device according to the present invention, preferably, the execution suspending unit suspends the input of the input characteristic data to the first model and suspends the second learning processing, and at a same time, carries out the input of the first noise-added data to the first model and carries out the first learning processing in a case where a number of executions of the second learning processing reaches a second predetermined value, and alternately carries out the suspension of one of the first learning processing and the second learning processing and the execution of the other, each time the number of executions of the first learning processing reaches the first predetermined value and each time the number of executions of the second learning processing reaches the second predetermined value, after the first learning processing is carried out.

According to the model parameter learning device, when the number of executions of the second learning processing reaches the second predetermined value, the input of the input characteristic data to the first model and the second learning processing are prohibited and, at the same time, the input of the first noise-added data to the first model and the first learning processing are carried out. Further, after the first learning processing is carried out, the suspension of one of the first learning processing and the second learning processing and the execution of the other are alternately carried out each time the number of executions of the first learning processing reaches the first predetermined value and each time the number of executions of the second learning processing reaches the second predetermined value. Thus, the processing for learning the model parameter of at least one of the first model and the second model such that the influence of a noise is suppressed, and the processing for learning the model parameter of at least one of the first model and the third model such that the influence of a noise is suppressed can be alternately carried out. This makes it possible to adequately learn the model parameters by using the two different learning methods.

In the model parameter learning device according to the present invention, the characteristic data is preferably the image data of an object.

According to the model parameter learning device, the advantageous effect described above can be obtained by using an image data of an object as the characteristic data.

In the model parameter learning device according to the present invention, the characteristic data acquiring unit and the teacher data acquiring unit respectively acquire the characteristic data and the teacher data as data in a virtual space.

According to the model parameter learning device, the characteristic data and the teacher data are acquired as data in a virtual space, thus obviating the need for actually acquiring such data in a real space by using a sensor or the like. This enables cost to be reduced accordingly. Further, using the noise-added data makes it possible to learn a model parameter such that the influence of a noise is suppressed also in the environment of a virtual space with less noise.

In the model parameter learning device according to the present invention, the teacher data acquiring unit preferably acquires the teacher data based on one of second image data which includes an object in an image and has a resolution or image quality that is equal to or higher than that of image data, or distance data indicating a distance to an object.

According to the model parameter learning device, teacher data is acquired on the basis of one of the second image data, which includes an object in an image and has a resolution or image quality that is equal to or higher than that of image data, and the distance data indicating the distance to an object. Therefore, if data which has, for example, a resolution or image quality that is higher than that of image data (a higher S/N ratio, a higher sensitivity, or a higher dynamic range) is used as teacher data, then a higher learning effect can be obtained, as compared with a case where image data of an equivalent resolution or image quality is used. In addition, if teacher data is acquired on the basis of distance data, which indicates the distance to an object, then the learning of a model parameter can be carried out while reflecting the distance data of the object.

In the model parameter learning device according to the present invention, preferably, the characteristic data acquiring unit is a first camera, and the teacher data acquiring unit is a second camera, a number of pixels of which is equal to or greater than a number of pixels of the first camera.

According to the model parameter learning device, a model parameter can be learned by using the two cameras. In particular, if the number of pixels of the second camera is greater than that of the first camera, then data having a higher resolution or image quality than that of image data can be used as teacher data. This makes it possible to obtain a higher learning effect than that in a case where a camera having an equivalent number of pixels is used.

In the model parameter learning device according to the present invention, preferably, the characteristic data acquiring unit is a camera, and the teacher data acquiring unit acquires teacher data based on the detection data of one of a LIDAR and a radar.

According to the model parameter learning device, the teacher data is acquired on the basis of one of a lidar and a radar, so that distance image data can be acquired as the teacher data. This enables the learning of a model parameter to be carried out while reflecting the distance data of an object.

In the model parameter learning device according to the present invention, preferably, a model parameter of at least the first model is learned in the first learning processing and a model parameter of at least the third model is learned in the second learning processing.

According to the model parameter learning device, the model parameters of at least the first model and the third model can be adequately learned.

A control device in accordance with the present invention includes: a storage unit which stores model parameters of a first model and a third model in a case where a number of alternate executions of first learning processing and second learning processing in the foregoing model parameter learning device reaches a third predetermined value, and the first model and the third model; and a control unit which controls a vehicle by using the model parameters, the first model and the third model stored in the storage unit.

According to the control device, a vehicle is controlled by using the model parameters, and the first model and the third model which are stored in the storage unit. In this case, the model parameters of the first model and the third model indicate the values obtained when the number of the alternate executions of the first learning processing and the second learning processing reaches the third predetermined value, meaning that the model parameters are adequately learned such that the influence of a noise in the first noise-added data and the second noise-added data or the influence of a noise in the first noise-added data can be suppressed, as described above. Hence, using such model parameters, the first model and the third model enables high robustness to be secured in controlling the vehicle.

A model parameter learning method in accordance with the present invention includes steps of: acquiring characteristic data, which is data of a parameter indicating at least one of a physical characteristic and a visual characteristic of an object; creating first noise-added data by adding predetermined first noise data to the characteristic data; inputting the first noise-added data to a first model; inputting output data of the first model to a second model; acquiring second model data, which is output data of the second model; acquiring teacher data corresponding to the characteristic data; and carrying out first learning processing for learning a model parameter of at least one of the first model and the second model such that an error between the second model data and the teacher data is minimized.

In the model parameter learning method according to the present invention, preferably, the input of the first noise-added data to the first model and the first learning processing are suspended in a case where a number of executions of the first learning processing reaches a first predetermined value, data obtained by adding predetermined second noise data to characteristic data, or the characteristic data is set as input characteristic data, the input characteristic data is input to the first model, output data of the first model is input to a third model which is separate from the second model, third model data output from the third model is acquired, and second learning processing for learning a model parameter of at least one of the first model and the third model is carried out such that a loss function that includes the third model data as an independent variable is minimized.

In the model parameter learning method according to the present invention, preferably, when the number of executions of second learning processing reaches the second predetermined value, the input of the second noise-added data to the first model and the second learning processing are suspended, and at a same time, the input of the first noise-added data to the first model and the first learning processing are carried out. After the first learning processing is carried out, the suspension of one of the first learning processing and the second learning processing and the execution of the other are alternately carried out each time the number of executions of the first learning processing reaches the first predetermined value and each time the number of executions of the second learning processing reaches the second predetermined value.

In the model parameter learning method according to the present invention, the characteristic data is preferably an image data of an object.

In the model parameter learning method according to the present invention, the characteristic data and the teacher data are preferably acquired as data in a virtual space.

In the model parameter learning method according to the present invention, preferably, image data is acquired such that the image data includes an image of an object, and teacher data is acquired based on one of second image data which includes the object in an image and which has a resolution or an image quality that is equal to or higher than that of the image data, and distance data that indicates the distance to the object.

In the model parameter learning method according to the present invention, preferably, the image data is acquired by a first camera, and the teacher data is acquired by a second camera, a number of pixels of which is equal to or greater than that of a first camera.

In the model parameter learning method according to the present invention, preferably, the image data is acquired by a camera, and the teacher data is acquired based on detection data of one of a LIDAR and a radar.

BRIEF DESCRIPTION OF THE DRAWINGS

FIG. 6 is a flowchart illustrating the automatic driving control processing by the control device.

DESCRIPTION OF THE PREFERRED EMBODIMENTS

The following will describe a model parameter learning device according to a first embodiment of the present invention with reference to the accompanying drawings. As will be described below, the model parameter learning device of the present embodiment is adapted to carry out various types of arithmetic processing, including model parameter learning processing, at a predetermined control cycle $\Delta T$. Specifically, the model parameter learning device is constituted of a controller (not illustrated). The controller is provided with a processor, storage, and a memory (not illustrated).

Figure 1:
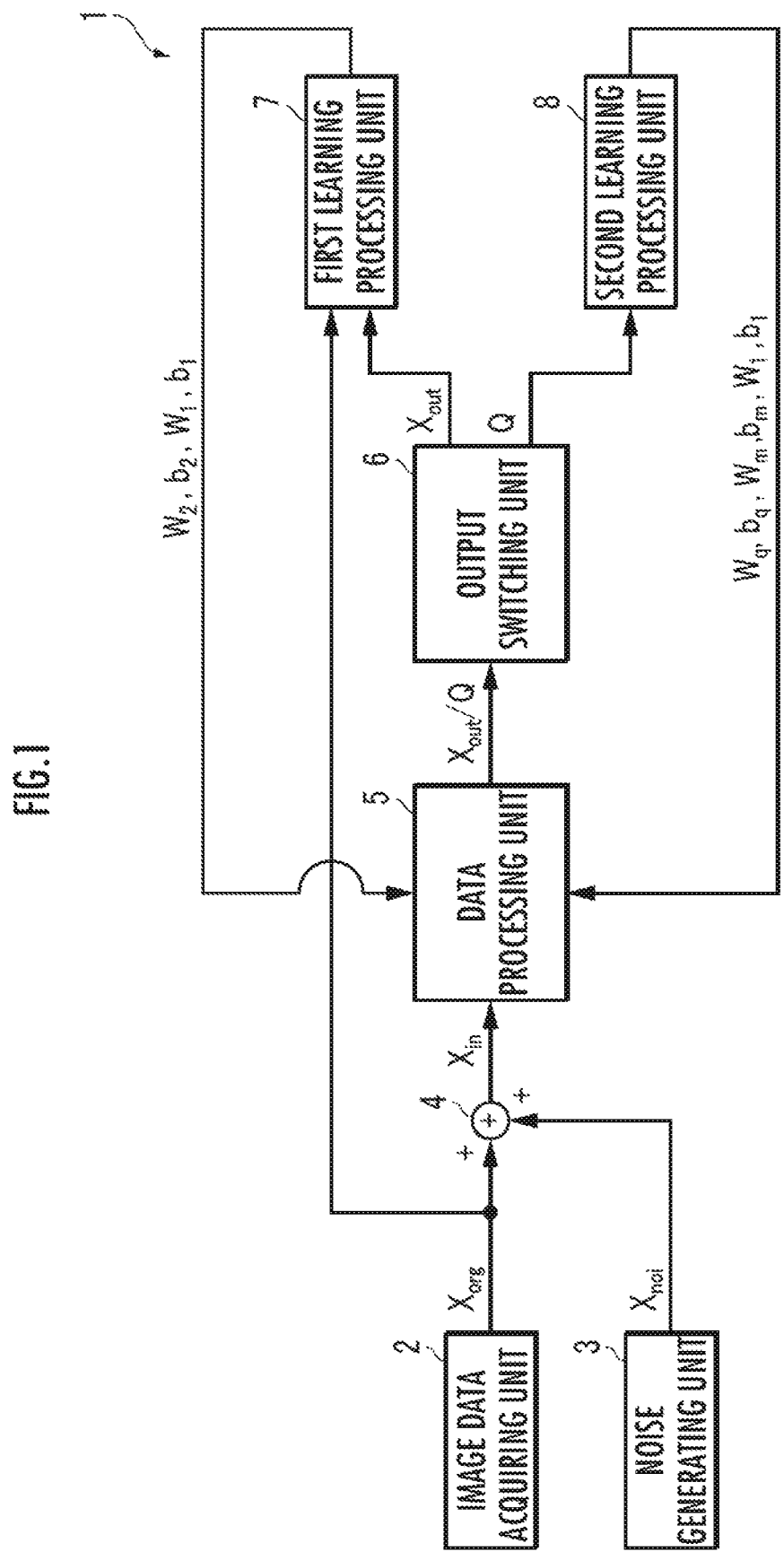
FIG. 1 is a block diagram illustrating the configuration of a model parameter learning device according to a first embodiment of the present invention.

Referring to FIG. 1, a model parameter learning device 1 according to the present embodiment includes an image data acquiring unit 2, a noise generating unit 3, an adder 4, a data processing unit 5, an output switching unit 6, a first learning processing unit 7, and a second learning processing unit 8. In the following description, various types of values acquired or calculated are to be stored in a memory of the controller.

First, the image data acquiring unit 2 acquires image data $X_{org}$ at the foregoing control cycle $\Delta T$, and outputs the image data $X_{org}$ to the adder 4. The image data $X_{org}$ is acquired from a frame of moving picture data in the form of a vector having, as the elements thereof, an Na (Na being plural) number of values $X_{org\_j}$ (j=1 to Na) of pixels acquired from one or more imaging elements. For example, as the moving picture data, data is used which has been created to indicate the transition of a landscape of entire circumference centering around a virtual vehicle when the vehicle travels on a road in a virtual space.

In the present embodiment, the image data acquiring unit 2 corresponds to a characteristic data acquiring unit and a teacher data acquiring unit, and the image data $X_{org}$ corresponds to characteristic data and teacher data.

Further, the noise generating unit 3 generates a noise $X_{noi}$ at the foregoing control cycle $\Delta T$ and outputs the generated noise $X_{noi}$ to the adder 4. The noise $X_{noi}$ is output as a vector of the Na number of elements having mainly an impulse noise, a Gaussian noise and a white noise as the components thereof. In the present embodiment, the noise $X_{noi}$ corresponds to predetermined first noise data and predetermined second noise data.

Further, the adder 4 calculates input data $X_{in}$ as the sum of the image data $X_{org}$ and noise $X_{noi}$ mentioned above according to expression (1) given below, and inputs the calculated input data $X_{in}$ to the data processing unit 5. The input data $X_{in}$ is calculated as a vector having the Na number of values $X_{in\_j}$ (j=1 to Na) as the elements thereof.

$$X_{in}=X_{org}+X_{noi} \quad (1)$$

In the present embodiment, the adder 4 corresponds to a first noise-added data creating unit and an input characteristic data setting unit, and the input data $X_{in}$ corresponds to first noise-added data and the input characteristic data.

Figure 2:
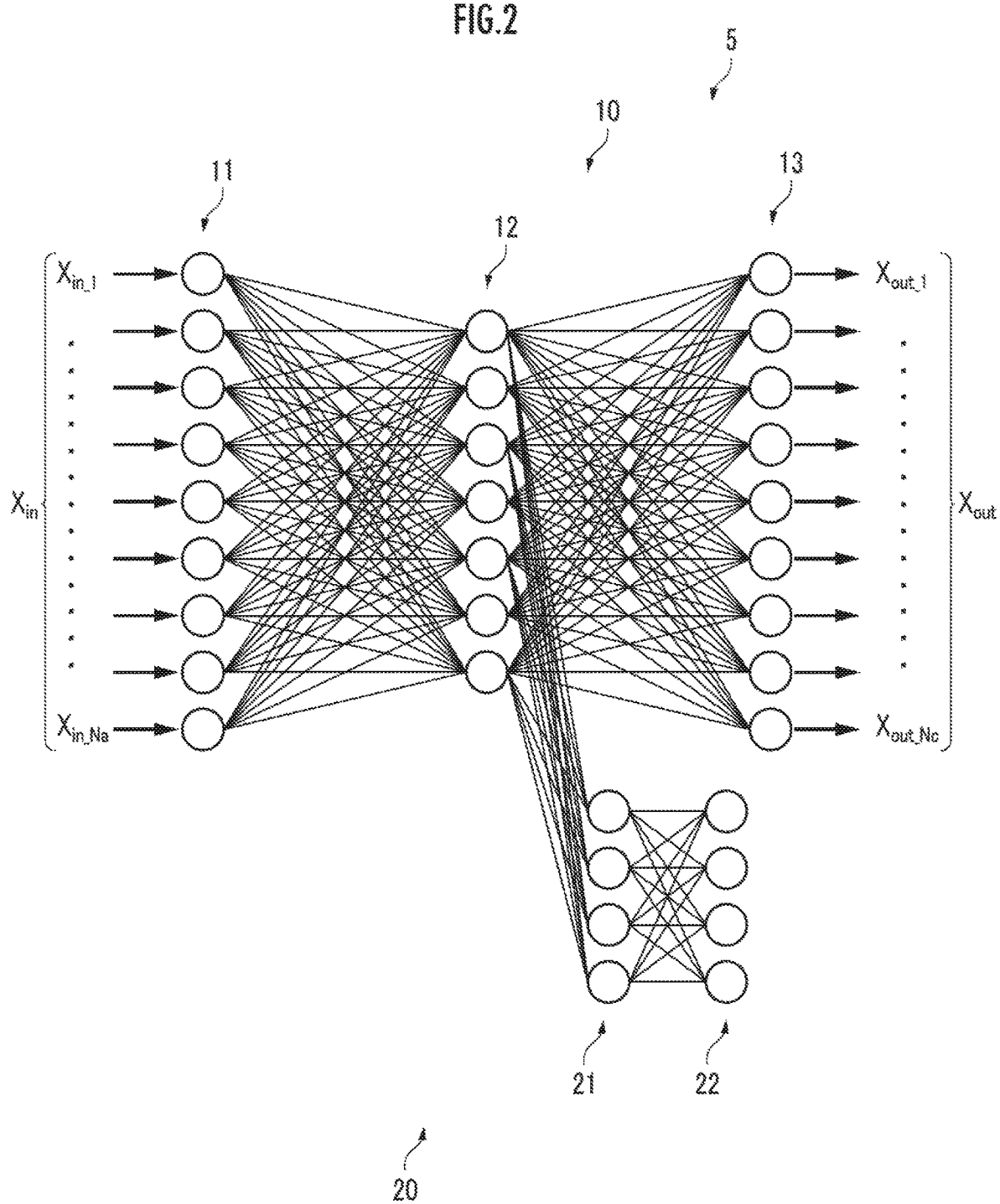
FIG. 2 is a diagram illustrating inputs and outputs when the forward propagation calculation of a neural network model for image processing is carried out in a data processing unit.
Figure 3:
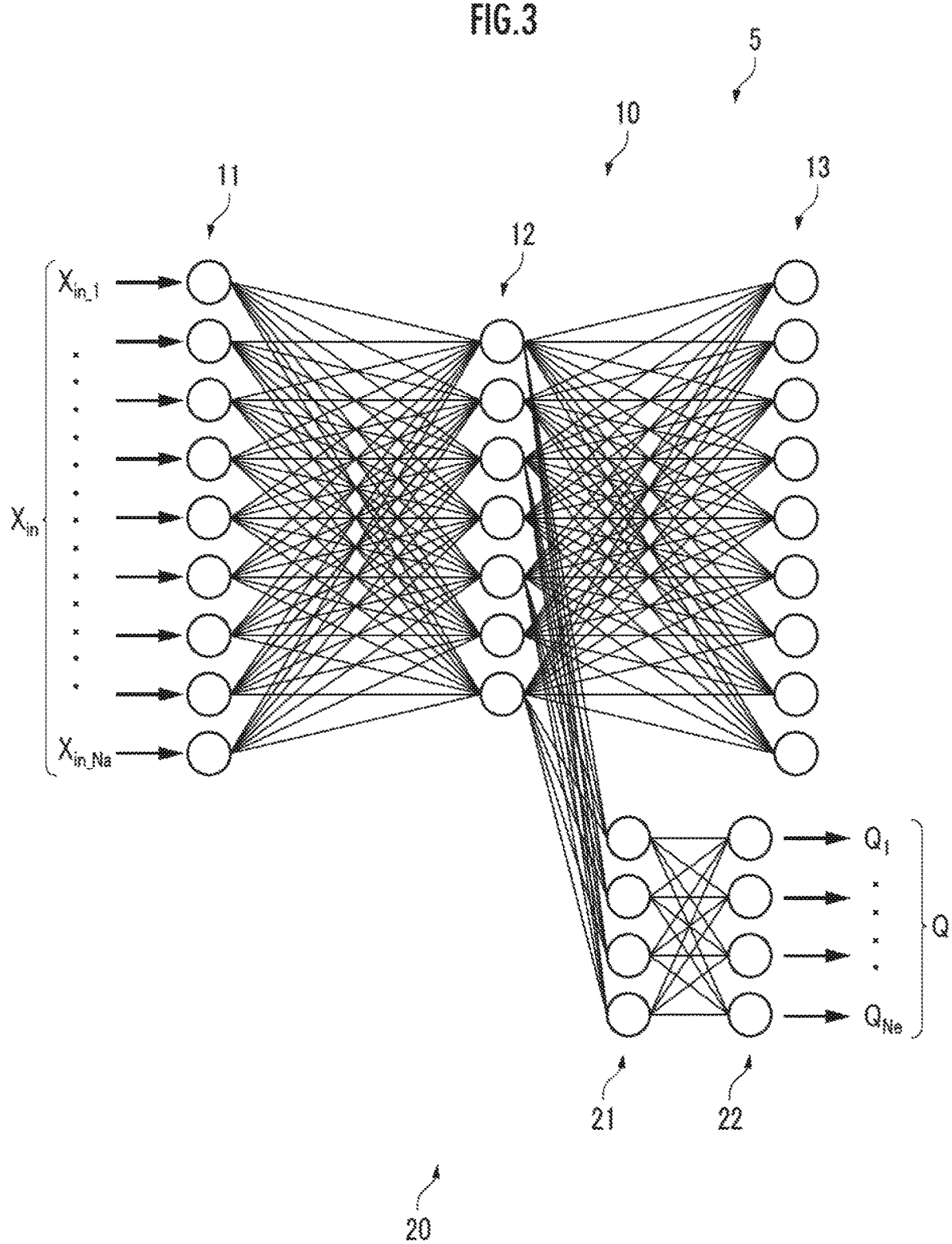
FIG. 3 is a diagram illustrating inputs and outputs when the forward propagation calculation of a neural network model for control processing is carried out in the data processing unit.

A description will now be given of the data processing unit 5. As illustrated in FIG. 2 and FIG. 3, the data processing unit 5 includes an image processing neural network model (hereinafter referred to as "the image processing NN model") 10 and a control processing neural network model (hereinafter referred to as "the control processing NN model") 20. In the present embodiment, the data processing unit 5 corresponds to a model data acquiring unit and an execution suspending unit.

In the data processing unit 5, the forward propagation calculation by the image processing NN model 10 and the forward propagation calculation by the control processing NN model 20 are alternately carried out once each at the foregoing control cycle ΔT, as described below. In this case, the forward propagation calculation by the control processing NN model 20 is suspended while the forward propagation calculation by the image processing NN model 10 is being carried out. Meanwhile, the forward propagation calculation by the image processing NN model 10 is suspended while the forward propagation calculation by the control processing NN model 20 is being carried out.

First, referring to FIG. 2, the image processing NN model 10 will be described. As illustrated in the drawing, the image processing NN model 10 includes an input layer 11 having the Na number of units, a hidden layer (intermediate layer) 12 having an Nb (Nb being plural) number of units connected to the input layer 11, and an output layer 13 having an Nc (Nc being plural) number of units connected to the hidden layer 12.

In the image processing NN model 10, the forward propagation calculation is carried out as described below. As illustrated in FIG. 2, when the Na number of elements $X_{in\_j}$ (j=1 to Na) of the foregoing input data $X_{in}$ are input to the Na number of units of the input layer 11, respectively, intermediate data $X_{h1}$ is calculated in the form of a vector having an Nb number of values as the elements thereof in the hidden layer 12 according to expressions (2) and (3) given below, and the calculation result is output to the output layer 13.

$$y_1=W_1 \cdot X_{in}+b_1 \quad (2)$$

$$X_{h1}=f_1(y_1) \quad (3)$$

In expression (2) given above, $y_1$ denotes a vector having the Nb number of values as the elements thereof. $W_1$ denotes a weight term and is composed of a matrix having an Nb×Na number of values as the elements thereof. $b_1$ denotes a bias term and is composed of a vector having an Nb number of values as the elements thereof. $f_1$ of expression (3) denotes an activation function (e.g. sigmoid function) that converts the vector $y_1$ into the intermediate data $X_{h1}$, which is a vector of the Nb number of elements, by acting on each of the Nb number of elements of the vector $y_1$.

Further, in the output layer 13, when the foregoing intermediate data $X_{h1}$ is input from the hidden layer 12, output data $X_{out}$ is calculated as a vector having an Nc number of values $X_{out\_j}$ (j=1 to Nc) as the elements thereof according to expressions (4) and (5) given below.

$$y_2=W_2 \cdot X_{h1}+b_2 \quad (4)$$

$$X_{out}=f_2(y_2) \quad (5)$$

In expression (4) given above, $y_2$ denotes a vector having the Nc number of values as the elements thereof. $W_2$ denotes a weight term and is composed of a matrix of an Nc×Nb number of elements. $b_2$ denotes a bias term and is composed of a vector of the Nc number of elements. $f_2$ of expression (5) denotes an activation function (e.g. sigmoid function) and converts the vector $y_2$ into the output data $X_{out}$, which has a vector of the Nc number of elements, by acting on each of the Nc number of elements of the vector $y_2$.

In the image processing NN model 10, when the output data $X_{out}$ (the second model data) is calculated as described above, the output data $X_{out}$ is output from the data processing unit 5 to the output switching unit 6.

In the case of the image processing NN model 10 described above, the section from the input layer 11 to the hidden layer 12 has a function for extracting the feature amount of the input data $X_{in}$, and the section from the hidden layer 12 to the output layer 13 has a function for restoring image data from the extracted feature amount. In the present embodiment, the section from the input layer 11 to the hidden layer 12 corresponds to the first model, and the section from the hidden layer 12 to the output layer 13 corresponds to the second model.

Referring now to FIG. 3, the control processing NN model 20 will be described. As illustrated in the drawing, the control processing NN model 20 includes an input layer 11 and a hidden layer 12, which are common to the image processing NN model 10 described above, a hidden layer 21 having an Nd (Nd being plural) number of units connected to the hidden layer 12, and an output layer 22 of an Ne (Ne being plural) number of units connected to the hidden layer 21.

In the control processing NN model 20, the forward propagation calculation is carried out as described below. As illustrated in FIG. 3, when the Na number of elements $X_{in\_j}$ (j=1 to Na) of the foregoing input data $X_{in}$ are input to the Na number of units of the input layer 11, intermediate data $X_{h1}$ is calculated as a vector having an Nb number of elements in the hidden layer 12 according to expressions (2) and (3) described above, and the calculation result is output to the hidden layer 21.

In the hidden layer 21, when the foregoing intermediate data $X_{h1}$ is received from the hidden layer 12, intermediate data $X_m$ is calculated as a vector of an Nd number of elements according to expressions (6) and (7) given below, and the calculation result are output to the output layer 22.

$$y_m=W_m \cdot X_{h1}+b_m \quad (6)$$

$$X_m=f_m(y_m) \quad (7)$$

In expression (6) given above, $y_m$ denotes a vector of the Nd number of elements. $W_m$ denotes a weight term and is composed of a matrix of an Nd×Nb number of elements. $b_m$ denotes a bias term and is composed of a vector of the Nd number of elements. $f_m$ of expression (7) denotes an activation function (e.g. sigmoid function) and converts the vector $y_m$ into intermediate data $X_m$, which has a vector of the Nd number of elements, by acting on each of the Nd number of elements of the vector $y_m$.

In the output layer 22, when the intermediate data $X_m$ described above is received from the hidden layer 21, output data Q is calculated as a vector having an Ne number of values $Q_n$ (n=1 to Ne) as the elements thereof according to expressions (8) and (9) given below.

$$y_q = W_q \cdot X_m + b_q \tag{8}$$

$$Q = f_q(y_q) \tag{9}$$

In expression (8) given above, $y_q$ denotes a vector having the Ne number of elements. $W_q$ denotes a weight term and is composed of a matrix of an Ne×Nd number of elements. $b_q$ denotes a bias term and is composed of a vector having the Ne number of elements. $f_q$ of expression (9) denotes an activation function (e.g. sigmoid function) and converts the vector $y_q$ into output data $Q_n$ (n=1 to Ne), which is a vector having the Ne number of elements, by acting on each of the Ne number of elements of the vector $y_q$.

In the control processing NN model 20, when the output data Q (the third model data) is calculated as described above by the forward propagation calculation, the output data Q is output from the data processing unit 5 to the output switching unit 6.

In the present embodiment, the section from the input layer 11 to the hidden layer 12 in the control processing NN model 20 corresponds to the first model, and the section from the hidden layer 12 to the output layer 22 corresponds to the third model.

A description will now be given of the output switching unit 6. When the output data $X_{out}$ is received from the data processing unit 5, the output switching unit 6 outputs the output data $X_{out}$ to the first learning processing unit 7. Meanwhile, when the output data Q is received from the data processing unit 5, the output switching unit 6 outputs the output data Q to the second learning processing unit 8.

A description will now be given of the first learning processing unit 7. The first learning processing unit 7 carries out the first learning processing as described below. The first learning processing calculates (learns) model parameters $W_2$, $b_2$, $W_1$, and $b_1$ of the image processing NN model 10 by the error backpropagation calculation at the control cycle ΔT described above.

Further, the first learning processing is carried out when the output data $X_{out}$ is input from the output switching unit 6 to the first learning processing unit 7, i.e., when the forward propagation calculation is carried out by the image processing NN model 10, and is suspended otherwise. In the present embodiment, the first learning processing unit 7 corresponds to the first learning unit and the execution suspending unit.

In the first learning processing, first, a loss function $L_{AE}$ is calculated as a mean square sum error according to expression (10) given below.

$$L_{AE} = \frac{1}{9} \sum_{j=1}^{9} (X_{org\_j} - X_{out\_j})^2 \tag{10}$$

Then, the weight term $W_2$ is calculated according to expression (11) given below.

$$W_2 = W_2' - \eta \cdot \frac{\partial L_{AE}}{\partial W_2} \tag{11}$$

In expression (11) given above, $W_2'$ denotes a previous value of the weight term, and η denotes a learning rate. Further, $\partial L_{AE}/\partial W_2$ of the right side denotes an error gradient, which is calculated by a well-known chain rule although the calculation formula is omitted here.

Further, a bias term $b_2$ is calculated according to expression (12) given below.

$$b_2 = b_2' - \eta \cdot \frac{\partial L_{AE}}{\partial b_2} \tag{12}$$

In expression (12) given above, $b_2'$ denotes a previous value of the bias term. Further, $\partial L_{AE}/\partial b_2$ denotes the error gradient and is calculated by a well-known chain rule.

Further, the weight term $W_1$ is calculated according to expression (13) given below.

$$W_1 = W_1' - \eta \cdot \frac{\partial L_{AE}}{\partial W_1} \tag{13}$$

In expression (13) given above, $W_1'$ denotes a previous value of the weight term. Further, $\partial L_{AE}/\partial W_1$ denotes the error gradient and is calculated by a well-known chain rule.

Further, the bias term $b_1$ is calculated according to expression (14) given below.

$$b_1 = b_1' - \eta \cdot \frac{\partial L_{AE}}{\partial b_1} \tag{14}$$

In expression (14) given above, $b_1'$ denotes a previous value of the bias term. Further, $\partial L_{AE}/\partial b_1$ denotes the error gradient and is calculated by a well-known chain rule.

The first learning processing unit 7 calculates the model parameters $W_2$, $b_2$, $W_1$ and $b_1$ as described above, and outputs these values to the data processing unit 5. The model parameters $W_1$ and $b_1$ calculated/learned as described above are used for the next forward propagation calculation in the control processing NN model 20, and the model parameters $W_2$ and $b_2$ are used for the next forward propagation calculation in the image processing NN model 10.

A description will now be given of the second learning processing unit 8. The second learning processing unit 8 carries out second learning processing as described below. The second learning processing calculates (learns) model parameters $W_q$, $b_q$, $W_m$, $b_m$, $W_1$, and $b_1$ of the control processing NN model 20 by a gradient method at the foregoing control cycle ΔT.

Further, the second learning processing is carried out when the output data Q is being input from the output switching unit 6 to the second learning processing unit 8, i.e., when the forward propagation calculation is being carried out by the control processing NN model 20, and is suspended otherwise. Hence, the second learning processing and the first learning processing are alternately carried out once each. In the present embodiment, the second learning processing unit 8 corresponds to a second learning unit and an execution suspending unit.

In the second learning processing, first, a loss function $L_{RL}$ is calculated according to expression (15) given below.

The loss function $L_{RL}$ corresponds to the result obtained by multiplying the square term of a TD error, which is obtained when the output data Q is taken as an action-value function, by a value ½.

$$L_{RL} = \tfrac{1}{2}(r + \gamma \cdot Q' - Q_a)^2 \tag{15}$$

In expression (15) given above, "r" denoting a compensation is calculated on the basis of the input data $X_{in}$ as a state by using a predetermined compensation calculation algorithm. Further, "γ" denotes a discount rate that is set such that 0<γ≤1 holds, and Qa denotes the value of an action-value function expected when an action denoted by n=a is selected from an element $Q_n$ (n=1 to Ne) of the output data Q. Further, Q' denotes the maximum value among the element $Q_n$ of the output data Q that is output from the control processing NN model 20 when input data $X_{in}$' is input to the control processing NN model 20 upon the execution of the next forward propagation calculation by the control processing NN model 20 after the input data $X_{in}$ is input to the control processing NN model 20 and the action denoted by "a" is selected.

Subsequently, the weight term $W_q$ is calculated according to expression (16) given below.

$$W_q = W_q' - \eta \cdot \frac{\partial L_{RL}}{\partial W_q} \tag{16}$$

In expression (16) given above, $W_q'$ denotes a previous value of the weight term. Further, $\partial L_{RL}/\partial W_q$ of the right side denotes an error gradient and is calculated by a well-known chain rule.

Further, the bias term $b_q$ is calculated according to expression (17) given below.

$$b_q = b_q' - \eta \cdot \frac{\partial L_{RL}}{\partial b_q} \tag{17}$$

In expression (17) given above, $b_q'$ denotes a previous value of the bias term. Further, $\partial L_{RL}/\partial b_q$ denotes an error gradient and is calculated by a well-known chain rule.

Further, the weight term $W_m$ is calculated according to expression (18) given below.

$$W_m = W_m' - \eta \cdot \frac{\partial L_{RL}}{\partial W_m} \tag{18}$$

In expression (18) given above, $W_m'$ denotes a previous value of the weight term. Further, $\partial L_{RL}/\partial W_m$ denotes an error gradient and is calculated by a well-known chain rule.

Further, the bias term $b_m$ is calculated according to expression (19) given below.

$$b_m = b_m' - \eta \cdot \frac{\partial L_{RL}}{\partial b_m} \tag{19}$$

In expression (19) given above, $b_m'$ denotes a previous value of the bias term. Further, $\partial L_{RL}/\partial b_m$ denotes an error gradient and is calculated by a well-known chain rule.

Further, the weight term $W_1$ is calculated according to expression (20) given below.

$$W_1 = W_1' - \eta \cdot \frac{\partial L_{RL}}{\partial W_1} \tag{20}$$

In expression (20) given above, $W_1'$ denotes a previous value of the weight term. Further, $\partial L_{RL}/\partial W_1$ denotes an error gradient and is calculated by a well-known chain rule.

Further, the bias term $b_1$ is calculated according to expression (21) given below.

$$b_1 = b_1' - \eta \cdot \frac{\partial L_{RL}}{\partial b_1} \tag{21}$$

In expression (21) given above, $b_1'$ denotes a previous value of the bias term. Further, $\partial L_{RL}/\partial b_1$ denotes an error gradient and is calculated by a well-known chain rule.

In the second learning processing unit 8, when the model parameters $W_q$, $b_q$, $W_m$, $b_m$, $W_1$, and $b_1$ are calculated as described above, these values are output to the data processing unit 5. Thus, the model parameters $W_1$ and $b_1$ calculated/learned as described above are used for the next forward propagation calculation in the image processing NN model 10, and the model parameters $W_q$, $b_q$, $W_m$ and $b_m$ are used for the next forward propagation calculation in the control processing NN model 20.

As described above, according to the model parameter learning device 1 of the first embodiment, the input data $X_{in}$ is created by adding the noise $X_{noi}$ to the image data $X_{org}$, and the created input data $X_{in}$ is input to the data processing unit 5. Accordingly, in the data processing unit 5, the forward propagation calculation [expressions (2) to (5)] by the image processing NN model 10 and the forward propagation calculation [expressions (2) and (3), and (6) to (9)] by the control processing NN model 20 are alternately carried out once each.

In such a case, by the forward propagation calculation in the image processing NN model 10, the model parameters $W_1$, $b_1$, $W_2$, and $b_2$ of the image processing NN model 10 are calculated according to the error backpropagation calculation [expressions (10) to (14)] in the first learning processing unit 7 when the output data $X_{out}$ is calculated. In other words, the model parameters $W_1$, $b_1$, $W_2$, and $b_2$ are calculated such that the loss function $L_{AE}$ is minimized.

The loss function $L_{AE}$ indicates the mean square sum error of the image data $X_{org}$, which is the teacher data, and the output data $X_{out}$, so that the model parameters $W_1$, $b_1$, $W_2$, and $b_2$ are calculated such that the error between the image data $X_{org}$ and the output data $X_{out}$ is minimized. This enables the model parameters $W_1$, $b_1$, $W_2$, and $b_2$ to be learned such that the output data $X_{out}$ will have values obtained with suppressed influence of the noise $X_{noi}$ in the input data $X_{in}$ by repeatedly carrying out the first learning processing.

Meanwhile, when the output data Q is calculated by the forward propagation calculation by the control processing NN model 20, the model parameters $W_1$, $b_1$, $W_m$, $b_m$, $W_q$, and $b_q$ of the control processing NN model 20 are calculated on the basis of the calculated output data Q according to the error backpropagation calculation [expressions (15) to (21)] in the second learning processing unit 8. In other words, the model parameters $W_1$, $b_1$, $W_m$, $b_m$, $W_q$, and $b_q$ are calculated such that the loss function $L_{RL}$ is minimized.

The loss function $L_{RL}$ is obtained by multiplying the square term of a TD error, which is obtained when the output data Q is taken as an action-value function, by a value ½, so that the model parameters $W_q$, $b_q$, $W_m$, $b_m$, $W_1$, and $b_1$ are calculated such that the TD error will be minimized. This enables the model parameters $W_q$, $b_q$, $W_m$, $b_m$, $W_1$, and $b_1$ to be learned such that the output data $X_{out}$ will have values obtained with suppressed influence of the noise $X_{noi}$ in the input data $X_{in}$ by repeatedly carrying out the second learning processing. Especially because the first learning processing and the second learning processing are repeatedly carried out in an alternate manner, the model parameters $W_1$, $b_1$, $W_2$, $b_2$, $W_m$, $b_m$, $W_q$ and $b_q$ can be adequately learned.

Further, the input data and the image data $X_{org}$ used as the teacher data are acquired as data in a virtual space, thus obviating the need for actually acquiring such data in a real space by using a sensor or the like. This enables cost to be reduced accordingly. Further, using the input data $X_{in}$ obtained by adding the noise $X_{noi}$ to the image data $X_{org}$ makes it possible to learn the model parameters $W_1$, $b_1$, $W_2$, $b_2$, $W_m$, $b_m$, $W_q$ and $b_q$ such that the influence of the noise $X_{noi}$ is suppressed also in a virtual space environment with less noise.

The first embodiment is an example using the image data $X_{org}$ as the characteristic data; however, the characteristic data in the present invention is not limited thereto, and may be other data insofar as the data is the data of a parameter of at least one of a physical characteristic and a visual characteristic of an object. For example, as the characteristic data, distance-target data may be used which indicates the attribute of other traffic participant (pedestrian and other vehicles or the like) or a target (a road boundary, a white line, an intersection, a signal or the like) and a distance by using a distance sensor and a target recognition module (a lidar, a radar, a sonar or the like).

In such a case, the following configuration, for example, may be used. In the configuration of FIG. 1 described above, a distance-target data acquiring unit may be provided in place of the image data acquiring unit 2, and the distance-target data of other traffic participant and target or the like may be acquired by the distance-target data acquiring unit by using a distance sensor and a target recognition module. Then, the data obtained by adding noise to the distance-target data may be input as the input data to the data processing unit 5. Further, by using the distance-target data as the teacher data, the first learning processing may be carried out as described above and the second learning processing may be carried out as described above. This configuration can also provide the same advantageous effect as that of the first embodiment.

Further, the first embodiment is an example in which the noise $X_{noi}$ having an impulse noise, a Gaussian noise or the like as a component thereof is used as the predetermined first noise data; however, the predetermined first noise data of the present invention is not limited thereto, and other noise data may be used insofar as the data is to be added as a noise to image data. For example, hostile perturbation against the first learning processing unit 7 may be used as the predetermined first noise data. In other words, a noise vector may be used, which has the same direction as that of a vector that increases the loss function $L_{AE}$ indicated by expression (10).

Further, the first embodiment is an example in which the noise $X_{noi}$ having an impulse noise, a Gaussian noise or the like as a component thereof is used as the predetermined second noise data; however, the predetermined second noise data of the present invention is not limited thereto, and other noise data may be used insofar as the data is to be added as a noise to image data. For example, hostile perturbation against the second learning processing unit 8, as indicated by expressions (22) and (23) to be discussed later, may be used as the predetermined second noise data.

Further, the first embodiment is an example in which the section from the input layer 11 to the hidden layer 12 of the image processing NN model 10 and the section from the hidden layer 12 to the output layer 13 thereof are used as the first model and the second model, respectively; however, the first model and the second model of the present invention are not limited thereto, and others may be used insofar as the output data of the first model is input to the second model and the second model data is output from the second model when the first noise-added data is input to the first model. For example, an auto-encoder architecture (refer to Document 1 given below) may be adopted as a model that combines the first model and the second model by using a convolutional neural network and a deconvolutional neural network as the first model and the second model, respectively.

Document 1: Ian Goodfellow, Yoshua Bengio and Aaron Courville, Deep Learning, MIT Press Meanwhile, the first embodiment is an example in which the section from the input layer 11 to the hidden layer 12 of the control processing NN model 20 and the section from the hidden layer 12 to the output layer 22 are used as the first model and the third model, respectively; however, the first model and the third model of the present invention are not limited thereto, and others may be used insofar as the output data of the first model is input to the third model and the third model data is output from the third model when input image data is input to the first model.

For example, a deep layer Q network architecture (refer to Document 2 given below) may be adopted as a model that combines the first model and the third model by using a convolutional neural network and a Q network as the first model and the third model, respectively.

Document 2: Volodymyr Mnih, Koray Kavukcuoglu, David Silver, Andrei A. Rusu, Joel Veness, Marc G. Bellemare, Alex Graves, Martin Riedmiller, Andreas K. Fidjeland, Georg Ostrovski, Stig Petersen, Charles Beattie, Amir Sadik, Ioannis Antonoglou, Helen King, Dharshan Kumaran, Daan Wierstra, Shane Legg & Demis Hassabis, Human-level control through deep reinforcement learning, Nature, 518, 529-533.

Further, in the first embodiment, the neural network model provided with the one layer of the hidden layer 12 has been used as the image processing NN model 10. Alternatively, however, a multilayer neural network model provided with two or more hidden layers may be used as the image processing NN model 10.

Further, in the first embodiment, the neural network model provided with the two layers of the hidden layers 12 and 21 has been used as the control processing NN model 20. Alternatively, however, a deep layer neural network model provided with three or more hidden layers may be used as the control processing NN model 20.

Further, the first embodiment is an example in which the model parameters $W_1$, $b_1$, $W_2$, and $b_2$ of the first model and the second model are learned in the first learning processing; however, the first learning processing of the present invention is not limited thereto, and the first learning processing may alternatively learn the model parameters of at least one of the first model and the second model. For example, the first learning processing may be configured to learn either the model parameters $W_1$ and $b_1$, or the model parameters $W_2$ and $b_2$.

Further, the first embodiment is an example in which the model parameters $W_1$, $b_1$, $W_m$, $b_m$, $W_q$ and $b_q$ of the first model and the third model are learned in the second learning processing; however, the second learning processing of the present invention is not limited thereto, and the second learning processing may alternatively learn the model parameters of at least one of the first model and the third model. For example, the second learning processing may be configured to learn either the model parameters $W_1$ and $b_1$, or the model parameters $W_m$, $b_m$, $W_q$ and $b_q$.

Meanwhile, the first embodiment is an example in which the loss function $L_{RL}$ indicated by expression (15) is used as the loss function in the second learning processing; however, the loss function in the second learning processing of the present invention is not limited thereto, and other loss function may be used insofar as the loss function includes a third model parameter as an independent variable. For example, a loss function may be used which is defined to include an output value T of a target Q-network in the expected compensation of a TD error in place of the action-value function Q.

Further, the first embodiment is an example in which the image data $X_{org}$ as the characteristic data is acquired from moving picture data of a virtual space. Alternatively, however, a configuration may be used in which a camera is used to acquire the image data $X_{org}$ from a real space.

Further, the first embodiment is an example in which the image data acquiring unit 2 is used as the teacher data acquiring unit; however, the teacher data acquiring unit of the present invention is not limited thereto, and other teacher data acquiring unit may be used insofar as the acquiring unit can acquire teacher data corresponding to characteristic data.

For example, the teacher data acquiring unit may alternatively be configured to acquire teacher data from a real space by using a camera. In such a case, if the characteristic data acquiring unit is a camera, then a camera having the number of pixels that is approximately equal to that of the camera of the characteristic data acquiring unit may be used, or a camera having a greater number of pixels than that of the characteristic data acquiring unit, or one of a lidar and a radar may be used.

In such a case, if a camera having a greater number of pixels than the camera of the characteristic data acquiring unit is used as the teacher data acquiring unit, then the difference in the number of pixels between two image data acquired by the two cameras may lead to a state in which the pixel positions of the two image data do not agree with each other. In such a case, one of the two image data can be subjected to interpolation calculation (e.g. bilinear interpolation calculation) such that the pixel positions of the two image data agree with each other. In this configuration, by using, as teacher data, data having a greater number of pixels than that of image data, a higher learning effect can be obtained, as compared with the case where image data having the same number of pixels are used.

Further, if one of a lidar and a radar is used as the teacher data acquiring unit, then distance image data can be created as the teacher data on the basis of the detection data of the lidar or the radar, whichever is used. This configuration enables the learning of model parameters to be carried out while reflecting the distance data of an object.

Further, the first embodiment is an example in which the first learning processing and the second learning processing are alternately carried out once each. Alternatively, however, a configuration may be adopted, in which these two types of learning processing are switched and carried out each time the number of executions of the first learning processing reaches a first predetermined value (e.g. a value 2 to 5) and each time the number of executions of the second learning processing reaches a second predetermined value (e.g. 2 to 5).

A description will now be given of a model parameter learning device according to a second embodiment of the present invention. This model parameter learning device has the same configuration as that of the model parameter learning device 1 of the first embodiment except that a part of the foregoing algorithm is different. Hence, the description will be focused only on the different aspect.

According to the model parameter learning device, a noise generating unit 3, a data processing unit 5, a first learning processing unit 7, and a second learning processing unit 8 repeatedly carry out various types of arithmetic processing in the order of (A1) to (A5) as described below.

(A1) First, the forward propagation calculation is carried out as described below in a control processing NN model 20 of the data processing unit 5. In the forward propagation calculation, image data $X_{org}$ is used in place of input data $X_{in}$ in the foregoing expression (2), and output data Q is calculated according to the foregoing expressions (3) and (6) to (9).

(A2) Then, in the second learning processing unit 8, model parameters $W_q$, $b_q$, $W_m$, $b_m$, $W_1$ and $b_1$ are calculated according to the foregoing expressions (15) to (21).

(A3) Further, in the noise generating unit 3, a hostile perturbation $X_{noi}'$ is calculated by the backpropagation calculation denoted by expressions (22) and (23) given below.

$$J = -\sum_{i=1}^{4} t_i \cdot \text{Log}_e \, (\text{softmax}_i(Q_i)) \qquad (22)$$

$$X_{noi}' = \varepsilon \cdot \text{sign} \left( \nabla_{x_{org}} J(x_{org}, Q) \right) \qquad (23)$$

In expression (22) given above, J denotes a cross entropy cost function, and $t_i$ denotes a one-hot vector with which only the maximum value of $Q_i$ becomes a value 1 and the rest becomes a value 0. Further, "softmax" denotes a softmax function. In expression (23) given above, $\varepsilon$ denotes a constant that determines the size of a noise. Further, $\nabla_{x_{org}} J$ $(X_{org}, Q)$ is an error gradient corresponding to $\partial J/\partial X_{org}$, and is calculated according to a well-known chain rule. In addition, sign $(\nabla_{x_{org}} J(X_{org}, Q))$ denotes a sign function, and indicates a value 1 when the error gradient $\nabla_{x_{org}} J(X_{org}, Q)$ takes a positive value, and indicates a value −1 when the error gradient $\nabla_{x_{org}} J(X_{org}, Q)$ takes a negative value.

(A4) Next, an adder 4 calculates the input data $X_{in}$ by using a hostile perturbation $X_{noi}'$ in place of a noise $X_{noi}$ in the foregoing expression (1), and an image processing NN model 10 of the data processing unit 5 calculates the output data Q by the forward propagation calculation of the foregoing expressions (2) to (5) by using the input data $X_{in}$.

(A5) Subsequently, the first learning processing unit 7 calculates the model parameters $W_2$, $b_2$, $W_1$, and $b_1$ by the backpropagation calculation of the foregoing expressions (10) to (14). After carrying out the calculations from (A1) to (A5) as described above, the procedure returns to (A1), and the calculations from (A1) to (A5) are repeatedly carried out.

As described above, the hostile perturbation $X_{noi}'$ is calculated as the product of the sign function of an error gradient and the constant $\varepsilon$, so that the first learning processing unit 7 calculates the model parameters $W_1$, $b_1$, $W_2$, and $b_2$ such that the influence of the hostile perturbation $X_{noi}'$ is suppressed. This makes it possible to promptly reduce the error of the output data Q by using the model parameters $W_1$ and $b_1$ when calculating the output data Q in the control processing NN model 20. As a result, the learning speed of the model parameters $W_1$, $b_1$, $W_m$, $b_m$, $W_q$, and $b_q$ in the second learning processing unit 8 can be increased.

Further, by learning the input data to which the perturbation that significantly changes the result of control processing has been added, a desired output can be obtained for an input that is not in acquired data. Thus, applying the control processing NN model 20 to a controller makes it possible to achieve the generalization and robustness of the controller.

The second embodiment is an example in which an action is selected from an element $Q_n$ of the output Q. If a continuous value is used as an output value, then the hostile perturbation can be calculated by using a cost function J indicated in expression (24) given below in place of the cost function J of the foregoing expression (22).

$$J = -\int_X \delta(X - X_q) \cdot \log p(X) dX \quad (24)$$

In expression (24) given above. $\delta(X-X_q)$ denotes a function that takes a value 1 when $X = X_q$ or takes a value 0 when $X \ne X_q$. Further, $p(X_q)$ of expression (24) given above is a value that indicates the probability distribution that can be taken by the output of a continuous value of the control processing NN model 20, and $X_q$ denotes an output value of the control processing NN model.

Further, in the present invention, an algorithm for extracting a feature amount (e.g. a HOG algorithm, a Hough transform algorithm, a canny transform algorithm, or a Sobel transform algorithm) and a quadratic curve fitting algorithm may be used as the first model, an information restoration algorithm for restoring information may be used as the second model, and one of a PID control algorithm, a model prediction control algorithm, a classifier, and a decision tree may be used as the third model.

If for example, the Sobel transform algorithm and the quadratic curve fitting algorithm are used as the first model, the information restoration algorithm for restoring information is used as the second model, and the PID control algorithm is used as the third model, then the model parameters will be learned as described below.

First, the model parameters of the first model and the second model are learned as described below. In the first model, a white line of a road is extracted as a feature amount by the Sobel transform algorithm as described below.

Initially, image data that includes a perturbation is resized to a predetermined size (pixels) and read in gray scale. Then, after determining the luminance gradient amount of each pixel in a particular direction, the pixels having gradient amounts that exceed a threshold value are extracted. From among the extracted pixels, only the candidate pixels to constitute the white line are extracted, taking into account the white line data position at the previous time (the previous control time) and the movement amount of the vehicle.

Further, on the extracted pixels, the quadratic curve coefficients are calculated by the quadratic curve fitting algorithm. Then, in the second model, the white line image data is restored by the information restoration algorithm from the quadratic curve data calculated by the first model.

After that, the filter parameter of the Sobel transform algorithm (a kernel size, a gradient direction, a detection threshold value or the like) in the first model a smoothing parameter in relation to previous time data, and/or the coefficient of the quadratic curve in the quadratic curve fitting algorithm are learned as model parameters such that the error between the white line image data restored by the second model and the teacher data, which is the image data that does not include the perturbation, is minimized. At the same time, a parameter of the information restoration algorithm (e.g. a setting parameter for deploying a white line on pixels) is learned such that the foregoing error is minimized.

Meanwhile, the model parameters of the first model and the third model are learned as follows. First, in the first model, the coefficient of the quadratic curve is calculated as described above. Then, in the third model, the central position of a travel lane is calculated by using the quadratic curve data calculated by the first model, and the steering control is carried out by the PID control algorithm by using the calculated central position as the desired value such that a vehicle 51 stays in the travel lane.

After that, taking the error (or a square error) between an actual travel track and the central position of the travel lane as the loss function, a feedback gain of the PID control algorithm, i.e., the model parameter, is learned, and the filter parameter of the Sobel transform algorithm (the kernel size, the gradient direction, the detection threshold value or the like) in the first model, the smoothing parameter in relation to previous time data, and/or the coefficient of the quadratic curve are learned such that the loss function is reduced.

As described above, also in the case where the learning of the model parameters of the first model, the second model, and the third model is carried out, the same advantageous effect as those of the first embodiment and the second embodiment described above can be obtained.

Figure 4:
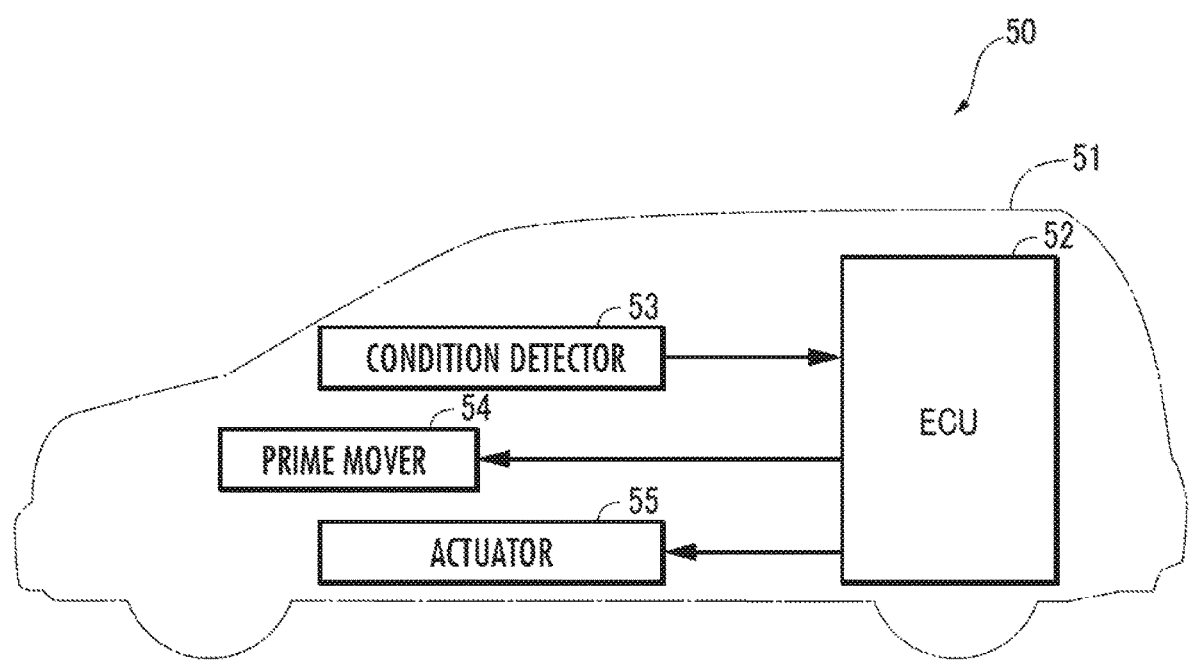
FIG. 4 is a diagram illustrating a control device in accordance with the present invention and an autonomous driving vehicle to which the control device has been applied.

A description will now be given of the control device in accordance with the present invention. Referring to FIG. 4, a control device 50 is applied to a four-wheel type autonomous driving vehicle 51 and is provided with an ECU 52. In the following description, the autonomous driving vehicle 51 will be referred to as "the vehicle 51."

Electrically connected to the ECU 52 are a condition detector 53, a prime mover 54, and an actuator 55. The condition detector 53 is constituted primarily of a camera, a millimeter wave radar, a lidar, a sonar, a GPS, and various sensors, and outputs peripheral condition data data_s, which indicates the peripheral condition of the vehicle 51, to the ECU 52.

In this case, the peripheral condition data data_s is composed of dozens of types of data, including a peripheral image, a vehicle speed, a steering angle, a yaw rate, an acceleration, a jerk, the coordinates of a road edge, the relative position with respect to another vehicle, and a relative speed with respect to another vehicle.

The prime mover 54 is constructed of for example, an electric motor. As will be discussed later, the operation state of the prime mover 54 is controlled when the automatic driving control is carried out by the ECU 52.

Further, the actuator 55 is constructed primarily of a braking actuator and a steering actuator. As will be discussed later, the operation of the actuator 55 is controlled when the automatic driving control is carried out.

Meanwhile, the ECU 52 is constructed of a microcomputer composed primarily of a CPU, a RAM, a ROM, an E2PROM, an I/O interface, and various electric circuits (none of these being illustrated). The E2PROM stores therein the control processing NN model 20 described above, and the model parameters $W_1$, $b_1$, $W_m$, $b_m$, $W_q$, and $b_q$ described above. In the control device 50, the ECU 52 corresponds to a storage unit and a control unit.

In this case, at the time when the ECU 52 is mounted in the autonomous driving vehicle 51, the values, which are obtained when the number of times the first learning processing and the second learning processing are alternately switched and carried out in the model parameter learning device 1 described above reaches a third predetermined value (e.g. a value 10000 to 100000), have been stored in the E2PROM as the model parameters $W_1$, $b_1$, $W_m$, $b_m$, $W_q$, and $b_q$.

As described below, the ECU 52 carries out mainly the learning control processing and the automatic driving control processing by using the control processing NN model 20 and the model parameters $W_1$, $b_1$, $W_m$, $b_m$, $W_q$, and $b_q$ on the basis of the condition data data_s from the condition detector 53.

Figure 5:
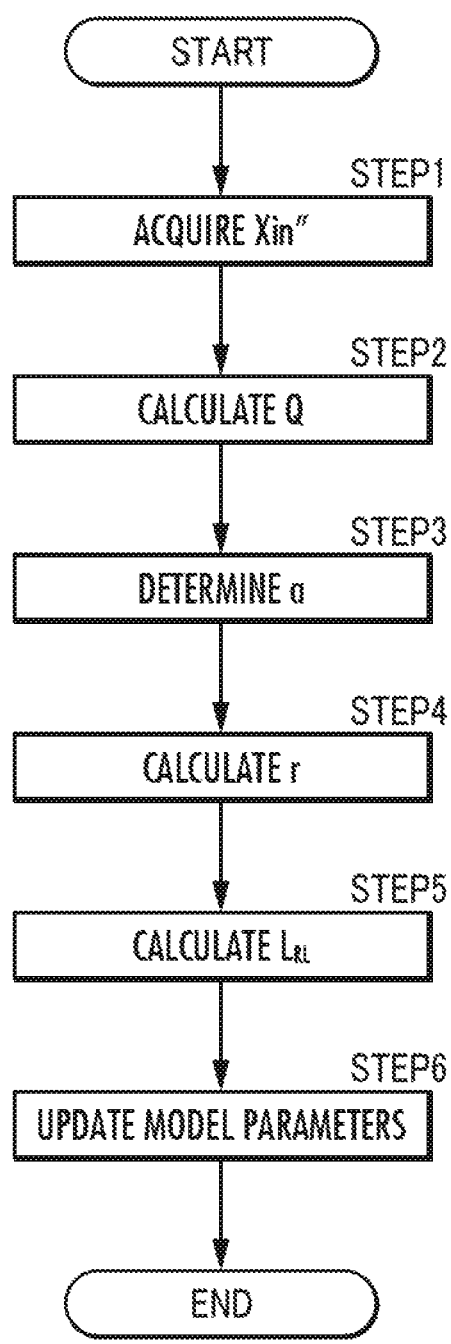
FIG. 5 is a flowchart illustrating the learning control processing by the control device.

Referring now to FIG. 5, the learning control processing will be described. The learning control processing is adapted to calculate an action "a" and update the model parameters $W_1$, $b_1$, $W_m$, $b_m$, $W_q$, and $b_q$ of the control processing NN model 20 and is carried out by the ECU 52 at a predetermined control cycle by the calculation method of the second learning processing.

The various values calculated in the following description are to be stored in the E2PROM of the ECU 52.

First, input data $X_{in}$" is acquired (STEP1 of FIG. 5). The input data $X_{in}$" is acquired as image data from a detection signal of the camera of the condition detector 53.

Subsequently, based on the input data $X_{in}$", output data Q is calculated by using the control processing NN model 20 (STEP2 of FIG. 5). More specifically, the output data Q is calculated by using an expression, in which the input data $X_{in}$ in the foregoing expression (2) has been replaced by the input data $X_{in}$", and the foregoing expressions (3) and (6) to (9).

Next, based on the output data Q, an optimal action "a" is determined by ε-greedy method (STEP3 of FIG. 5). The action "a" in this case is determined as the command values of the steering amount and the acceleration/deceleration of the vehicle 51.

Subsequently, a compensation "r" is calculated by using a predetermined compensation calculation algorithm (STEP4 of FIG. 5).

Next, a loss function $L_{RL}$ is calculated according to the foregoing expression (15) (STEP5 of FIG. 5).

Then, based on the loss function $L_{RL}$, the model parameters of the control processing NN model 20 are updated (calculated) by the error backpropagation calculation indicated by expressions (16) to (21) as described above (STEP6 of FIG. 5). After the model parameters are updated as described above, the present processing is terminated.

Referring now to FIG. 6, the automatic driving control will be described. The automatic driving control is adapted to control the driving condition of the vehicle 51, and is carried out by the ECU 52 at a predetermined control cycle. The following will describe an example of the automatic driving control for passing a vehicle ahead.

First, as with STEP1 to STEP3 of FIG. 5, the input data $X_{in}$" is acquired (STEP20 of FIG. 6), the output data Q is calculated (STEP21 of FIG. 6), and the optimal action "a," namely, the command value of the steering amount and the command value of the acceleration/deceleration of the vehicle 51 are determined (STEP22 of FIG. 6).

Subsequently, the prime mover 54 is driven such that the acceleration/deceleration of the vehicle 51 reaches the command value of the acceleration/deceleration (STEP23 of FIG. 6).

Next, the actuator 55 is driven such that the steering amount of the vehicle 51 reaches the determined command value of the steering amount (STEP24 of FIG. 6). After that, the present processing is terminated.

As described above, according to the control device 50, the automatic driving control of the vehicle 51 is carried out by using the control processing NN model 20 and the model parameters $W_1$, $b_1$, $W_m$, $b_m$, $W_q$, and $b_q$ stored in the E2PROM. In this case, the model parameters $W_1$, $b_1$, $W_m$, $b_m$, $W_q$, and $b_q$ of the control processing NN model 20 take the values obtained when the number of times the first learning processing and the second learning processing are alternately carried out reaches the third predetermined value at the time when the ECU 52 is mounted in the autonomous driving vehicle 51, so that sufficient learning will have been carried out to enable the influence of a noise to be suppressed, as described above. Thus, high robustness against noise can be secured in the automatic driving control of the vehicle 51 by using such model parameters $W_1$, $b_1$, $W_m$, $b_m$, $W_q$, and $b_q$ and the control processing NN model 20.

In the ECU 52, the learning control processing of FIG. 5 may be omitted, and the automatic driving control processing of FIG. 6 may be carried out.

What is claimed is:

1. A model parameter learning device comprising:
    a characteristic data acquiring unit which acquires characteristic data, which is data of a parameter indicating at least one of a physical characteristic and a visual characteristic of an object;
    a first noise-added data creating unit which creates first noise-added data by adding predetermined first noise data to the characteristic data;
    a model data acquiring unit which has a first model and a second model, and inputs output data of the first model to the second model and acquires second model data output from the second model in a case where the first noise-added data is input to the first model;
    a teacher data acquiring unit which acquires teacher data corresponding to the characteristic data; and
    a first learning unit which carries out first learning processing for learning a model parameter of at least one of the first model and the second model such that an error between the second model data and the teacher data is minimized.

2. The model parameter learning device according to claim 1, further comprising:
    an execution suspending unit which suspends inputting the first noise-added data to the first model and the first learning processing in a case where a number of executions of the first learning processing reaches a first predetermined value; and
    an input characteristic data setting unit which sets data obtained by adding predetermined second noise data to the characteristic data, or the characteristic data, as input characteristic data,
    wherein the model data acquiring unit further has a third model which is separate from the second model, and which inputs the output data of the first model to the third model and acquires third model data output from the third model when the input of the input characteristic data to the first model in a case where the first learning processing is being suspended, and
    the model parameter learning device further comprises a second learning unit which carries out second learning processing for learning a model parameter of at least one of the first model and the third model such that a loss function that contains the third model data as an independent variable, is minimized.

3. The model parameter learning device according to claim 2,
wherein the execution suspending unit suspends the input of the input characteristic data to the first model and suspends the second learning processing, and at a same time, carries out the input of the first noise-added data to the first model and carries out the first learning processing in a case where a number of executions of the second learning processing reaches a second predetermined value, and alternately carries out the suspension of one of the first learning processing and the second learning processing and the execution of the other, each time the number of executions of the first learning processing reaches the first predetermined value and each time the number of executions of the second learning processing reaches the second predetermined value, after the first learning processing is carried out.

4. The model parameter learning device according to claim 1,
wherein the characteristic data is an image data of the object.

5. The model parameter learning device according to claim 1,
wherein the characteristic data acquiring unit and the teacher data acquiring unit respectively acquires the characteristic data and the teacher data as data in a virtual space.

6. The model parameter learning device according to claim 4,
wherein the teacher data acquiring unit acquires the teacher data based on one of second image data which includes the object in an image and has a resolution or image quality that is equal to or higher than that of the image data, and distance data indicating a distance to the object.

7. The model parameter learning device according claim 6,
wherein the characteristic data acquiring unit is a first camera, and
the teacher data acquiring unit is a second camera, a number of pixels of which is equal to or greater than a number of pixels of the first camera.

8. The model parameter learning device according to claim 6,
wherein the characteristic data acquiring unit is a camera, and
the teacher data acquiring unit acquires the teacher data based on detection data of one of a LIDAR and a radar.

9. The model parameter learning device according to claim 3,
wherein a model parameter of at least the first model is learned in the first learning processing, and
a model parameter of at least the third model is learned in the second learning processing.

10. A control device comprising:
a storage unit which stores the model parameters of the first model and the third model in a case where a number of alternate executions of the first learning processing and the second learning processing in the model parameter learning device described in claim 9 reaches a third predetermined value, and the first model and the third model; and
a control unit which controls a vehicle by using the model parameters, the first model, and the third model, stored in the storage unit.

11. A model parameter learning method comprising steps of:
acquiring characteristic data, which is the data of a parameter indicating at least one of a physical characteristic and a visual characteristic of an object;
creating first noise-added data by adding predetermined first noise data to the characteristic data;
inputting the first noise-added data to a first model;
inputting output data of the first model to a second model;
acquiring second model data, which is output data of the second model;
acquiring teacher data corresponding to the characteristic data; and
carrying out first learning processing for learning a model parameter of at least one of the first model and the second model such that an error between the second model data and the teacher data is minimized.

12. The model parameter learning method according to claim 11,
wherein the input of the first noise-added data to the first model and the first learning processing are suspended in a case where a number of executions of the first learning processing reaches a first predetermined value;
data obtained by adding predetermined second noise data to the characteristic data, or the characteristic data is set as input characteristic data;
the input characteristic data is input to the first model;
output data of the first model is input to a third model, which is separate from the second model;
third model data output from the third model is acquired; and
second learning processing for learning a model parameter of at least one of the first model and the third model is carried out such that a loss function that includes the third model data as an independent variable is minimized.

13. The model parameter learning method according to claim 12,
wherein the input of the input characteristic data to the first model and the second learning processing are suspended, and at a same time, the input of the first noise-added data to the first model and the first learning processing are carried out in a case where a number of executions of the second learning processing reaches a second predetermined value, and
the suspension of one of the first learning processing and the second learning processing and the execution of the other are alternately carried out, each time the number of executions of the first learning processing reaches the first predetermined value and each time the number of executions of the second learning processing reaches the second predetermined value, after the first learning processing is carried out.

14. The model parameter learning method according to claim 11,
wherein the characteristic data is an image data of an object.

15. The model parameter learning method according to claim 11,
wherein the characteristic data and teacher data are acquired as data in a virtual space.

16. The model parameter learning method according to claim 14,
wherein the teacher data is acquired based on one of second image data which includes the object in an image and which has a resolution or an image quality that is equal to or higher than that of the image data, and distance data that indicates a distance to the object.

17. The model parameter learning method according to claim 16,
wherein the image data is acquired by a first camera, and the teacher data is acquired by a second camera, a number of pixels of which is equal to or greater than a number of pixels of the first camera.

18. The model parameter learning method according to claim 16,
wherein the image data is acquired by a camera, and the teacher data is acquired based on detection data of one of a LIDAR and a radar.

* * * * *